United States Patent
Anupam et al.

(10) Patent No.: US 6,687,739 B2
(45) Date of Patent: Feb. 3, 2004

(54) METHODS AND APPARATUS FOR ENABLING SHARED WEB-BASED INTERACTION IN STATEFUL SERVERS

(75) Inventors: Vinod Anupam, Scotch Plains, NJ (US); Narain H. Gehani, Summit, NJ (US); Kenneth R. Rodemann, Bridgewater, NJ (US); Musiri Srivathsan Sriram, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 189 days.

(21) Appl. No.: 10/075,798

(22) Filed: Feb. 13, 2002

(65) Prior Publication Data

US 2002/0073155 A1 Jun. 13, 2002

Related U.S. Application Data

(63) Continuation of application No. 09/227,522, filed on Jan. 8, 1999.

(51) Int. Cl.$^7$ ................................................. G06F 15/16
(52) U.S. Cl. ........................ 709/204; 709/203; 709/205; 709/206; 709/217; 709/219; 709/225
(58) Field of Search ................................. 709/203, 204, 709/205, 206, 217, 219, 225; 707/501, 514

(56) References Cited

U.S. PATENT DOCUMENTS

| | | | | | |
|---|---|---|---|---|---|
| 5,787,470 A | * | 7/1998 | DeSimone et al. | ......... | 711/124 |
| 5,835,718 A | * | 11/1998 | Blewett | ...................... | 709/218 |
| 5,941,957 A | * | 8/1999 | Ingrassia, Jr. et al. | ...... | 709/248 |
| 5,951,652 A | * | 9/1999 | Ingrassia, Jr. et al. | ...... | 709/248 |
| 5,954,798 A | * | 9/1999 | Shelton et al. | .............. | 709/224 |
| 6,035,332 A | * | 3/2000 | Ingrassia, Jr. et al. | ...... | 709/224 |
| 6,085,193 A | * | 7/2000 | Malkin et al. | ................ | 707/10 |
| 6,085,234 A | * | 7/2000 | Pitts et al. | ................... | 709/217 |
| 6,098,064 A | * | 8/2000 | Pirolli et al. | .................... | 707/2 |
| 6,175,842 B1 | * | 1/2001 | Kirk et al. | ................... | 707/513 |
| 6,240,444 B1 | * | 5/2001 | Fin et al. | ..................... | 709/205 |
| 6,240,461 B1 | * | 5/2001 | Cieslak et al. | .............. | 709/235 |
| 6,295,551 B1 | * | 9/2001 | Roberts et al. | ............. | 709/205 |
| 6,298,356 B1 | * | 10/2001 | Jawahar et al. | ............. | 707/201 |

* cited by examiner

*Primary Examiner*—Saleh Najjar

(57) ABSTRACT

A method of interactively sharing information between at least two devices in a computer network, each device having a respective browser associated therewith for handling the information, includes retrieving information from an information source in the network for storage in response to receipt of a retrieval request from a first browser associated with a first device. The method further includes sending the stored information to at least a second browser of at least a second device in response to receipt of a similar request therefrom, the second device receiving the request from the first device, such that the devices can share the information retrieved from the information source in response to the single request made to the source. Preferably, a surrogate is established in at least the first device for informing the second device of the request made such that the browser of the second device can make the similar request. Also, the information available from the information source in the computer network may include dynamically changing (i.e., stateful) content.

28 Claims, 9 Drawing Sheets

METHODS AND APPARATUS FOR ENABLING SHARED WEB-BASED INTERACTION IN STATEFUL SERVERS

CROSS REFERENCE TO RELATED APPLICATION

The present application is a continuation of the pending U.S. patent application identified as Ser. No. 09/227,522 filed Jan. 8, 1999 and entitled "Methods and Apparatus for Enabling Shared Web-Based Interaction in Stateful Servers," hereby incorporated herein by reference.

FIELD OF THE INVENTION

The present invention relates to methods and apparatus for providing shared web-based interaction and, more particularly, to providing shared web-based interaction involving dynamically generated or stateful content.

BACKGROUND OF THE INVENTION

A browser is a software program run on a computer that allows a computer user to request, view, manipulate and/or send information across a computer network. For example, a web-based browser serves as a user's front-end interface to the World Wide Web (WWW) on the Internet. As is known, using a web-based browser, a user types in or selects the address or URL (Uniform Resource Locator) of a website to request a webpage (e.g., homepage) associated with the website that he wishes to visit. The browser transmits the request over the Internet to the Web server with which the website is associated and the server downloads the homepage to the browser for viewing by the user. The homepage is typically an index to other pages on that website that can be accessed by clicking on icons which represent the addresses of the other pages.

In U.S. Pat. No. 5,991,796, issued Nov. 23, 1999 and entitled: "Technique For Obtaining And Exchanging Information On World Wide Web," which is a continuation of U.S. Pat. No. 5,862,330, issued Jan. 19, 1999 with the same title, a technique is disclosed for shared Internet browsing among multiple users (e.g., clients) using unmodified browsers and servers. The technique employs client-side executable content that is dynamically downloaded into the browser, such as an applet. An applet is a limited-function, utility program. The applet at one endpoint communicates with an applet of a collaborator (e.g., another browser) via some communication channel, and allows the "connected" browsers to move from webpage to webpage in synchrony, viewing the same (or related) content. One way of achieving this interaction is to have all connected browsers submit the same URL. However, in the case of dynamically generated content, this causes the Web server to execute the same request multiple times, once for each participating browser (i.e., as many times as the same request was respectively made by the multiple users). This may not be desirable, particularly, when a URL submission causes an order to be placed on the Web server. That is, multiple executions of the request will cause multiple orders to be placed on the Web server. This may not be what the multiple users intended in participating in the shared browsing session. That is, the intent may have been only to place a single, joint order at the end of the shared browsing session.

For example, various e-commerce websites accessible via specific Web servers allow users to select items they wish to order and place them in a virtual "shopping cart." When the user completes his selections, he then clicks on a "Place Order" icon resulting in a URL request being submitted to the e-commerce server for placement of the order. However, if multiple users are interactively browsing in order to place one joint order, as described above, then when one user clicks on the "Place Order" icon, each browser submits an identical URL request. This has the undesirable effect of placing as many orders for the same items as there are connected browsers.

Proxy servers have been proposed for improving access to data on the Internet. A proxy server is a facility used by a client (i.e., like a browser) which receives a request for a particular URL from a client (e.g., a Web browser) and forwards the request (on behalf of the client, as its proxy) to the appropriate Web server. The proxy server receives the response and transmits the response to the requesting client. A firewall proxy, for example, accepts requests from a client inside the firewall for data provided by servers outside the firewall, and retrieves the data. A caching proxy server additionally saves the obtained response, and provides the response to any other client that autonomously makes the same request, subject to certain rules which govern how long data will be held in the cache, and when it will be refreshed.

However, caching proxy servers do not cache responses that are dynamically generated, e.g., output of CGI (Common Gate Interface) requests, Active Server Pages, etc. For example, a financial information website accessible via a particular Web server may have a feature that allows a user to request and receive a price quote on a particular stock. For instance, clicking on a "Get Quote" icon will result in a URL request being submitted to the Web server. The Web server may then have to search for the latest stock quote or, itself, request and retrieve the latest stock price from another source. Assuming the user sets up a caching proxy server, a price quote requested by a user in the morning will be retrieved and cached in the caching proxy server. However, if the user clicks on the "Get Quote" icon in the afternoon, the caching proxy server still only has the morning price quote stored, which is likely no longer accurate. Since the caching proxy server does not dynamically update the information, a new request must be placed to the website.

Further, proxy servers require changes in the client-side browser configuration. That is, the user must manually modify the browser settings to direct all URL requests to the proxy server, which then makes the request. Still further, attempting to use a proxy server in conjunction with shared browsing does not work in the presence of a firewall. That is, the browser can only use one proxy at a time, whereas two are needed, i.e., one to get outside the firewall, and the other one to support the shared interaction.

SUMMARY OF THE INVENTION

The present invention provides methods and apparatus for permitting interactive browsing over a computer network such that multiple users (e.g., clients) are provided with dynamically generated content (i.e., data that is subject to state changes) retrieved from an information source in the network when needed. The disclosed techniques do not require any client-side modifications and operate transparently even in the presence of a firewall.

Advantageously, the present invention provides these and other inventive features by employing an intermediary network element, referred to as a gateway, situated between user devices and information sources in a computer network. The gateway enables a method of interactively sharing information between at least two devices in the computer network, each device having a respective browser associated therewith for handling the information. The method includes retrieving information from an information source in the network in response to receipt of a request, from a first browser associated with a first device, to retrieve the information. The retrieved information is stored in association with the request received from the first browser. Preferably, this is accomplished via a cache memory associated with the gateway. The method also includes sending the stored information to at least a second browser of at least a second device in response to receipt of a similar request therefrom such that the devices can share the information retrieved from the information source in response to the single request. It is to be appreciated that the second browser receives the request from the first browser so that it can make the similar request to the gateway. In this manner, the original request from the first browser is executed by the information source only once, but shared by multiple user devices. The gateway may be implemented at a server in the network, at any of the user devices, or even at the information source.

In another embodiment of the invention, surrogate applets are preferably dynamically downloaded from the computer network to at least some of the browsers of the devices participating in the interactive browsing session. The surrogate applets are executable code that serve as interfaces between the browsers, as well as translators of browser requests. The requests are translated or modified by the surrogates so that they can be directed to the gateway by the respective browsers.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The invention will be described below in conjunction with an exemplary web-based browser and web server arrangement that is compatible with standard web-based browsers such as, for example, the NETSCAPE browser (available from Netscape Communications Corporation), the standard hypertext transfer protocol (HTTP), and hypertext markup language (HTML). Although particularly well-suited for implementation over the Internet using Transmission Control Protocol/Internet Protocol (TCP/IP) connections, the invention is not limited to use with any particular type of network or network communication protocol. The disclosed techniques are suitable for use with a wide variety of other networks and protocols, and many different types of browsers installed on client computers. Further, the term "processor" as used herein is intended to include any processing device, including a CPU (central processing unit), which may be utilized in a client computer, server computer, or any other computer employed in conjunction with the invention. Also, the term "memory" as used herein is intended to include memory associated with a processor or CPU, such as, for example, RAM, ROM, a fixed memory device (e.g., hard drive), or a removable memory device (e.g., diskette). In addition, the processing device may include one or more input devices, e.g., keyboard, for inputting data to the processing unit, as well as one or more output devices, e.g., CRT display and/or printer, for providing results associated with the processing unit. Further, it is to be understood that one or more processing devices within the network may share associated resources. Accordingly, the software instructions or code for performing the methodologies of the invention, described herein, may be stored in one or more of the associated memory devices (ROM, fixed or removable memory) and, when ready to be utilized, loaded into RAM and executed by a CPU.

Before providing a detailed description of preferred embodiments of interactive browsing methods and apparatus of the invention, an explanation will follow as to a preferred method for establishing a surrogate on the computer of each user who wishes to participate in an interactive browsing session. This method is described in the above-referenced U.S. Pat. Nos. 5,991,796 and 5,862,330.

Figure 1:
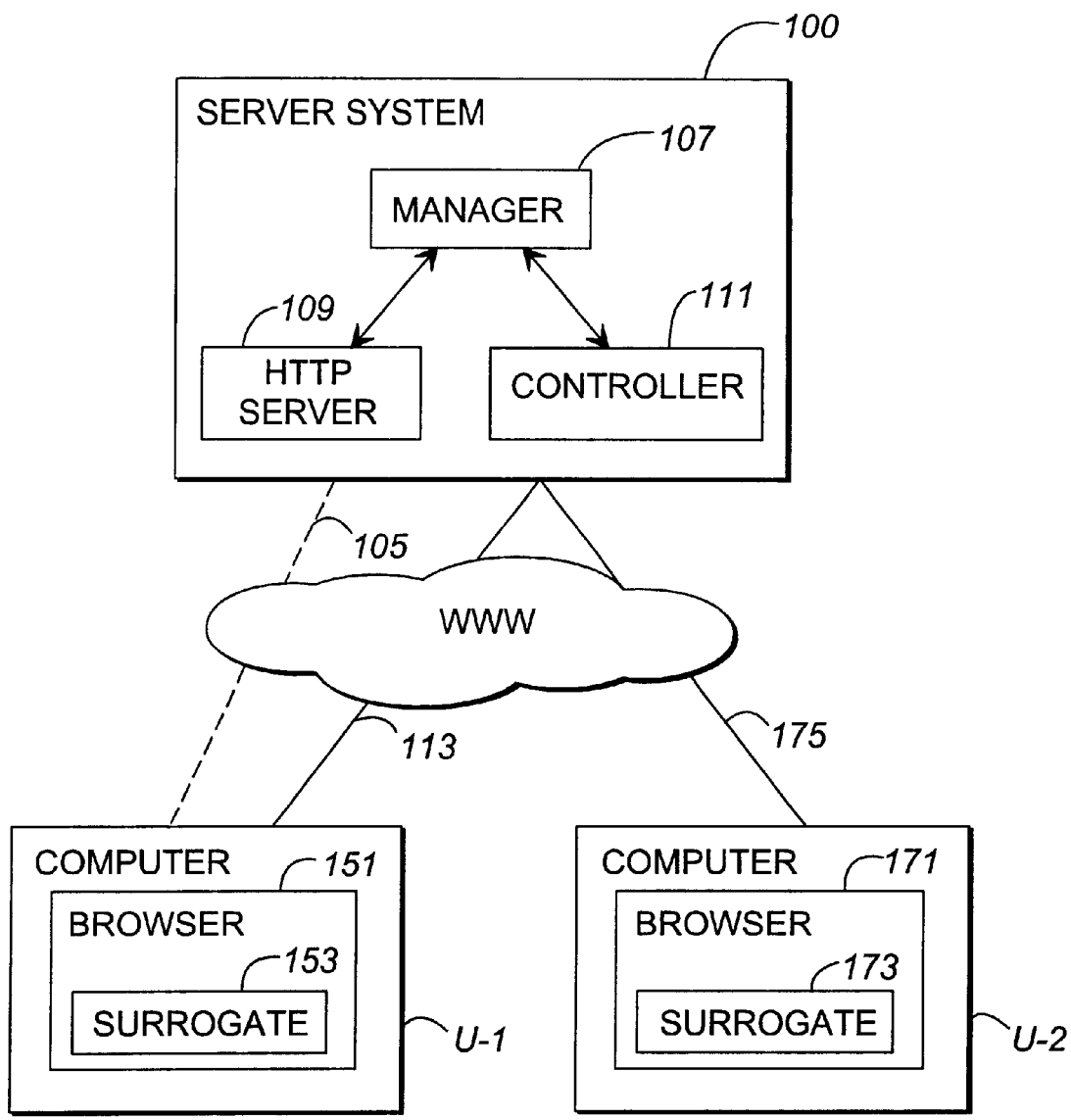
FIG. 1 is a block diagram illustrating a server system for the establishment of surrogates which may be employed with the invention.

FIG. 1 illustrates a server system 100 which is connected to the World Wide Web (WWW) as a web server. System 100 works compatibly with standard web browsers such as the NETSCAPE browser, HTTP and HTML. Among other things, system 100 provides users with services of: (a) collaborative browsing of HTML documents at various websites on WWW, and (b) real-time interactive communications between the users. Specifically, with system 100, during a collaborative browsing session, multiple users or collaborators are allowed to synchronously and cooperatively browse information from websites addressable by their uniform resource locators (URLs). The collaborators may also interact with one another through text-chat communications for example. In addition, system 100 allows users to freely join and exit an on-going session and is capable of scaling its capacity to accommodate a changing number of sessions and collaborators in a particular session.

As shown in FIG. 1, a user may utilize computer U-1 to access system 100 over WWW at a predetermined URL. Computer U-1 may be a conventional personal computer (PC) running standard web browser 151 such as the NETSCAPE browser. As soon as U-1 is connected to system 100 through link 105, manager 107 in system 100 starts communicating with U-1 through web browser 151 and HTTP server 109 having a common gate interface (CGI).

Figure 2A:
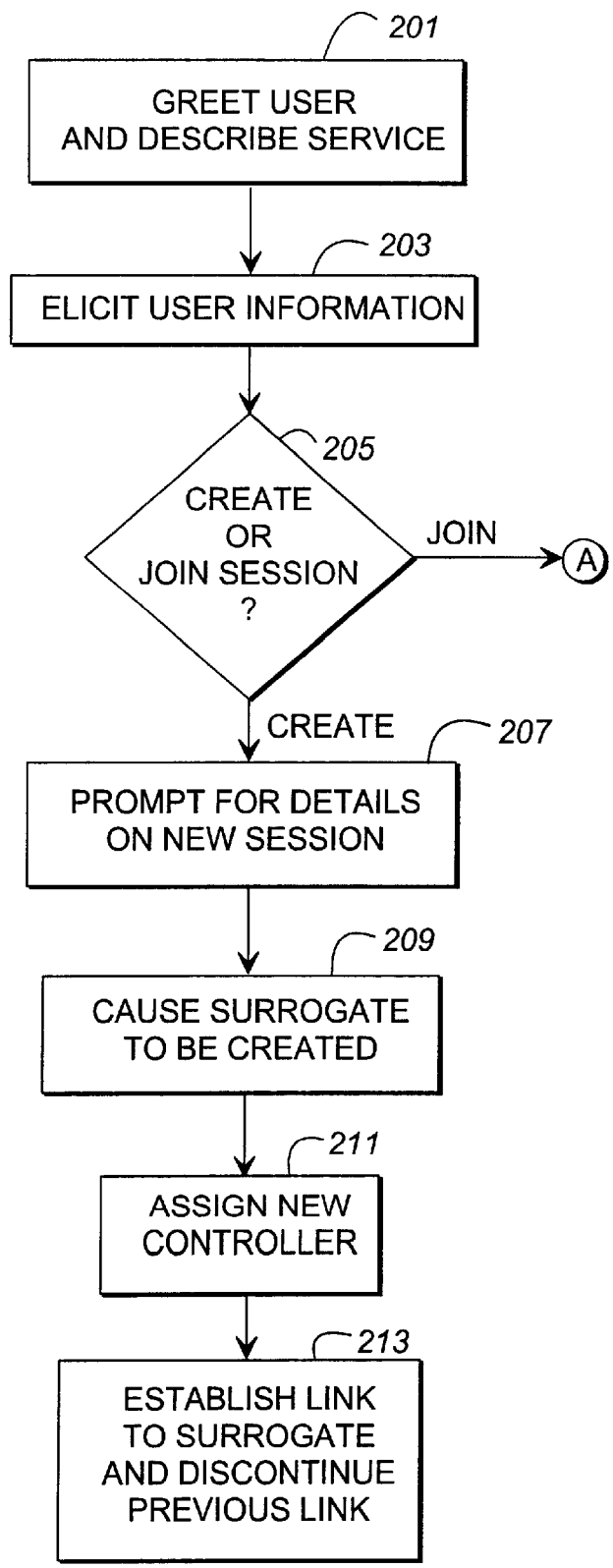
FIGS. 2A and 2B are flow charts jointly illustrating the steps in carrying out the operation of the server system of FIG. 1.
Figure 2B:
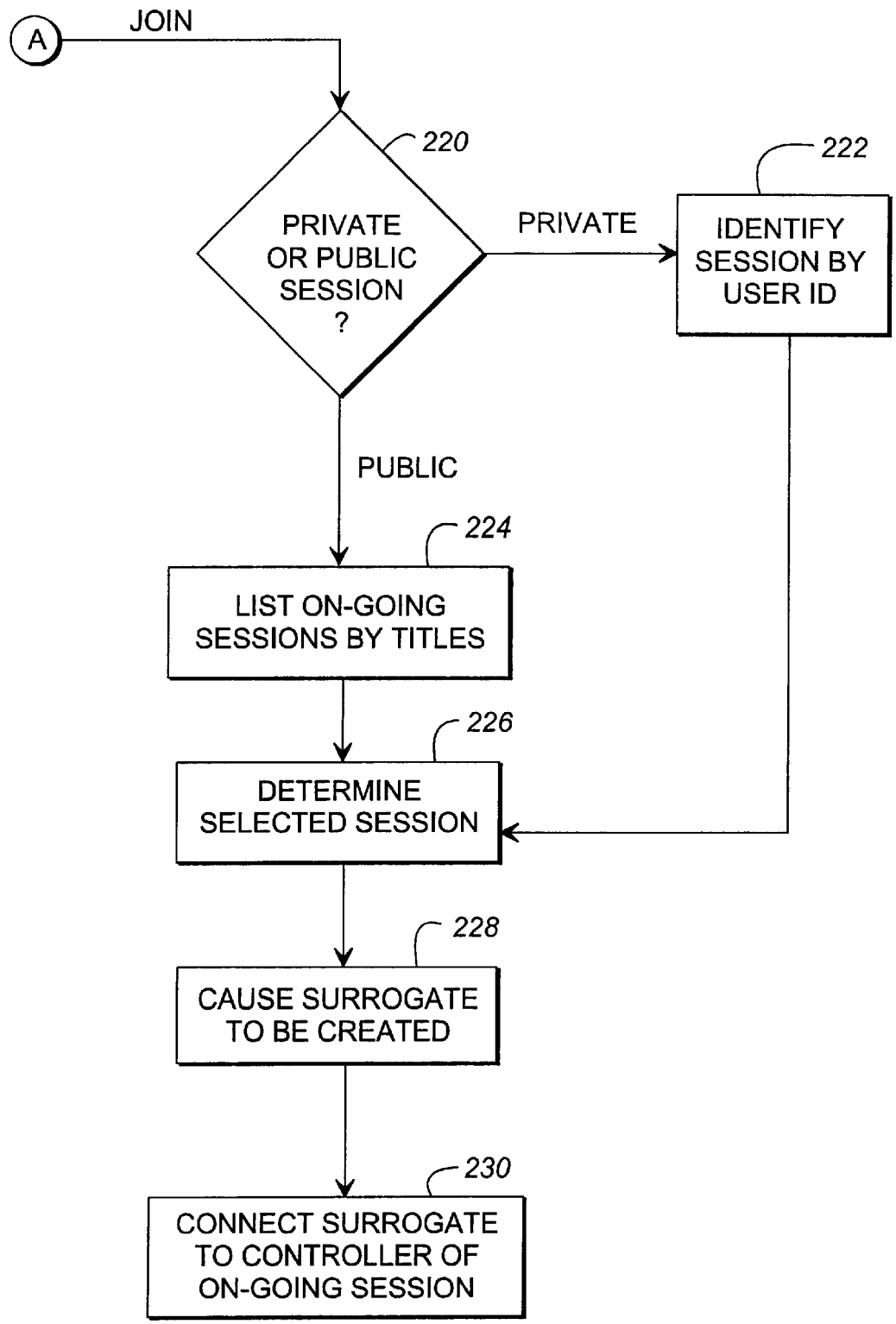

Manager 107 comprises a service routine for helping a user to establish a collaborative browsing session. FIGS. 2A and 2B illustrate the steps of the service routine. At step 201, manager 107 causes a "homepage" to be displayed on U-1, which greets the user, and describes the service provided by system 100. Manager 107 then elicits from U-1 user information, as indicated at step 203. This information includes a user identification (ID), password and other administrative data necessary for ensuring that the user is an authorized user. At step 205, manager 107 inquires U-1 as to whether the user wants to create a session, or join an on-going session. In this instance, the user of U-1 chooses to create a session. Manager 107, at step 207, then prompts the user for the details on the session to be created, such as the purpose or the topic of the session, and whether it is a private or public session. By way of example, if it is a private session, a would-be collaborator must identify the user, by his/her user ID, who created the session in order to join it. If it is a public session, the topic of the session will be listed and is searchable by a would-be collaborator.

In this instance, the user of U-1 replies that the session to be created is public and the purpose of the session is to, for example, shop for an automobile. Manager 107 proceeds to start the new session and causes surrogate 153 to be created within browser 151 in computer U-1, as indicated at step 209. To that end, system 100 transmits to computer U-1 mobile code pursuant to a mobile programming language such as, for example, the standard JAVA language. Thus, in this instance, the mobile code may be in the form of a JAVA applet. Surrogate 153 is realized when the applet starts to run within browser 151 as soon as it reaches computer U-1. Surrogate 153 is further described hereinbelow, and it suffices to know for now that it serves as an assistance to the browser to carry out the session.

Since in this instance it is a new session, manager 107, at step 211, assigns a new controller, numerically denoted 111, to control and regulate the session. Manager 107 at step 213 causes controller 111 to be connected to surrogate 153 through link 113, and at the same time discontinues link 105. Surrogate 153 serves as an interface between browser 151 and controller 111. Among other things, surrogate 153 monitors user interaction with the browser, and reports the user interaction to controller 111.

It should be noted at this point that surrogate 153 is realized using a JAVA applet which is transmitted to and executed on U-1 on an on-demand basis, no software needs to be installed or maintained on the user computer beforehand as in the traditional applications. Thus, any standard JAVA-enabled browsers such as, for example, the NETSCAPE browser can be utilized. However, other browsers that support executable content may be employed. In other words, system 100 does not require the users to have specialized browser software to take advantage of the service.

A second user may utilize computer U-2 to access system 100 at the predetermined URL to join an on-going session. After computer U-2 establishes a link (not shown) to HTTP server 109, manager 107 similarly goes through steps 201 and 203 of FIG. 2A, as previously described. However, at step 205, the user of U-2 in this instance chooses to join an on-going session. As such, manager 107 queries U-2 as to whether the second user wants to join a private session or public session, as indicated at step 220 in FIG. 2B. In this instance, the second user chooses to join a public session, and manager 107 proceeds to step 224. Otherwise, the second user needs to identify the private session to be joined by the user ID of the creator of that session, as indicated at step 222.

In any event, at step 224, manager 107 causes a list of all the on-going sessions to be displayed on computer U-2 including, for example, the automobile shopping session created by the user of computer U-1. Manager 107 then proceeds to step 226 where it determines the particular session selected by the second user. In this example, the second user chooses to join the automobile shopping session by pointing and clicking using a mouse device at the listed topic. At step 228, surrogate 173 is created on computer U-2, in a manner described before, within browser 171 which may be different from browser 151. Once surrogate 173 is created, knowing that the automobile shopping session was assigned to controller 111, manager 107 causes controller 111 to be connected to surrogate 170 through link 175, as indicated at step 230.

In this particular example, the creator of the session is afforded the same capabilities as the other collaborators, except that the creator has the control of leading the session. In addition, the surrogates connected to controller 111 are programmed to allow the collaborators to interactively communicate in text with one another in real time. The collaborators may point and click at a specified icon on their computers using a mouse device to make the text-chat connections for exchanging their opinions on automobiles as the HTML documents unfold before them. However, it will be appreciated that a person skilled in the art may program controller 111 to enforce certain access control. For example, different collaborators may be afforded by controller 111 different capabilities during a collaborative session. Controller 111 may also enforce a priority scheme whereby the collaborators take turns to lead the session and communicate with one another.

Other computer users who want to either create a session or join an on-going session go through the similar process to that of U-1 or U-2 described above. However, a controller may be overloaded at certain point as more and more collaborators joining a particular session regulated by the controller. Because of the server-based architecture of system 100 where intelligence and information on every user's connection resides in manager 107, the system capacity is readily scalable to accommodate a growing number of the collaborators, without affecting the service quality. Once the number reaches a predetermined threshold at a controller, manager 107 employs a new controller to connect the excessive collaborators. The new controller and existing controllers for the same session dynamically reorganize themselves in a hierarchy (e.g., star topology) to facilitate communications with one another and their coordination to carry out the session in a synchronous manner.

Furthermore, as more and more controllers are engaged, the initial capacity of system 100 may run out. Again, because of the architecture of system 100, a new controller may be engaged using additional hardware which can be easily absorbed into system 100. Similarly, when the number of sessions exceeds a predetermined threshold, multiple managers similar to manager 107 are instituted and the managers are dynamically reorganized in a particular hierarchy (e.g., star topology).

A text-chat communications capability between the collaborators is provided through the cooperation of the surrogates. Other means of communications can also be provided, in addition to or in lieu of the "text chat" communications, using the surrogates. These other communications means include standard telephone, Internet phone, packet phone and video conferencing facilities.

Finally, system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

Given the above description as to a preferred method of establishing surrogates in browsers, methods and apparatus for interactive web-based browsing according to the invention will now be described.

Figure 3:
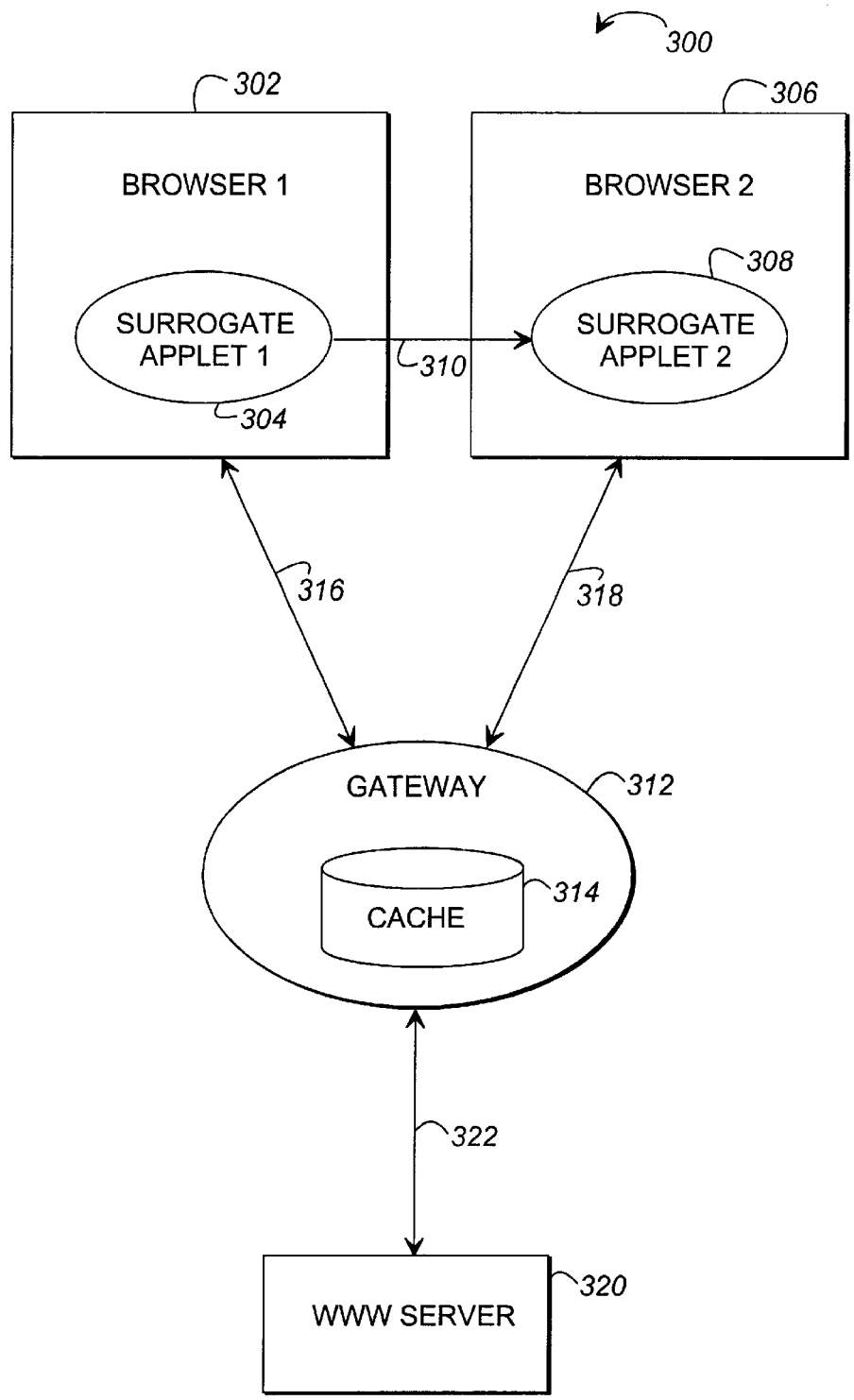
FIG. 3 is a block diagram illustrating an exemplary embodiment of a web-based interactive browsing arrangement according to the present invention.

Referring now to FIG. 3, portions of an interactive browsing system 300 according to an exemplary embodiment of the invention are shown. The system 300 includes a first browser 302 having a surrogate 304 associated therewith. As previously explained, the browser 302 is a computer software program that runs on a computer of the system 300 and allows a user, inter alia, to place information requests to various websites associated with network servers. The surrogate 304 is also a computer software program that is run in conjunction with the browser 302 on a computer of the system 300 and, as will be explained, provides the necessary functionality to provide interactive browsing between browser 302 and other browsers according to the invention. It is to be appreciated that the surrogate 304 is executable content that may preferably be dynamically downloaded into each client that is participating in the interactive browsing arrangement. That is, the invention contemplates each user downloading a surrogate applet from a designated network server (e.g., server 100) to his computer when he intends to interactively browse websites with another user. The surrogate is preferably established at the user's computer via the server system 100 and techniques described above with respect to FIGS. 1, 2A and 2B. The system 300 of the invention also includes a second browser 306 with a second surrogate 308, which provide similar functionality to another user as the browser 302 and surrogate 304 provide to the first user. The surrogate 304 may also be established in conjunction with server system 100. The surrogates 304 and 308 are coupled to one another via communications channel 310. It should also be understood that more than two users may be coupled via their respective surrogates in this manner.

Further, the interactive browsing system 300 of the invention includes an intermediary element 312, hereinafter referred to as a "gateway." The gateway 312 is advantageously coupled between the surrogates 304 and 308, respectively via communication channels 316 and 318, and a WWW server 320, via a communications channel 322. It is to be appreciated that while FIG. 3 illustrates only one WWW server in system 300, the gateway 312 may preferably be coupled to more than one or all such servers on the Internet. The gateway 312 also includes a cache memory 314 for storing information, as will be explained below, in accordance with the invention.

Advantageously, a surrogate (304 or 308) intercepts URL requests from its associated browser (302 or 306) that are directed to the Web server 320 responsible for retrieving and/or generating the requested content (e.g., HTML document). The surrogate may intercept all URL requests made by a user via the browser or only requests matching some specified criteria. The initiating surrogate via its associated browser directs the request to the gateway 312 (via channel 316 or 318). The gateway then sends the URL request to the Web server 320 (via channel 322), stores the response(s) received from the server 320 (via channel 322), and directs the initiating surrogate via its associated browser to retrieve the stored response (via channel 316 or 318). The initiating surrogate then preferably directs all other connected surrogates (via channel 310) to retrieve the response via their associated browsers from the gateway 312. This may be done, for example, through the controller 111 in server system 100 (FIG. 1). Advantageously, the original request is thus executed only once by the WWW server 320, while the response is shared by multiple endpoints via the intermediary gateway.

Figure 4:
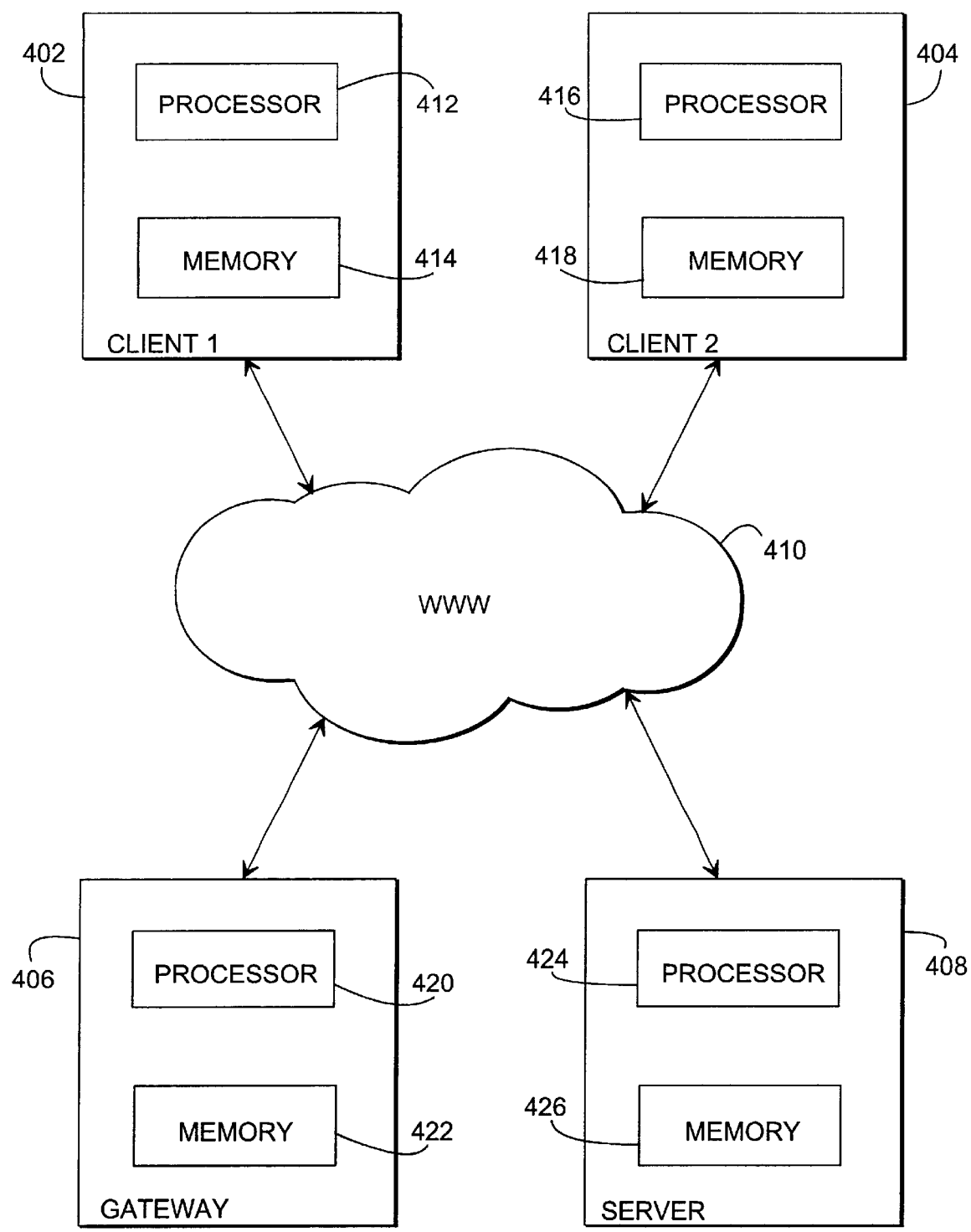
FIG. 4 is a block diagram illustrating a client-server system in which web-based interactive browsing according to the invention may be implemented.
Figure 5A:
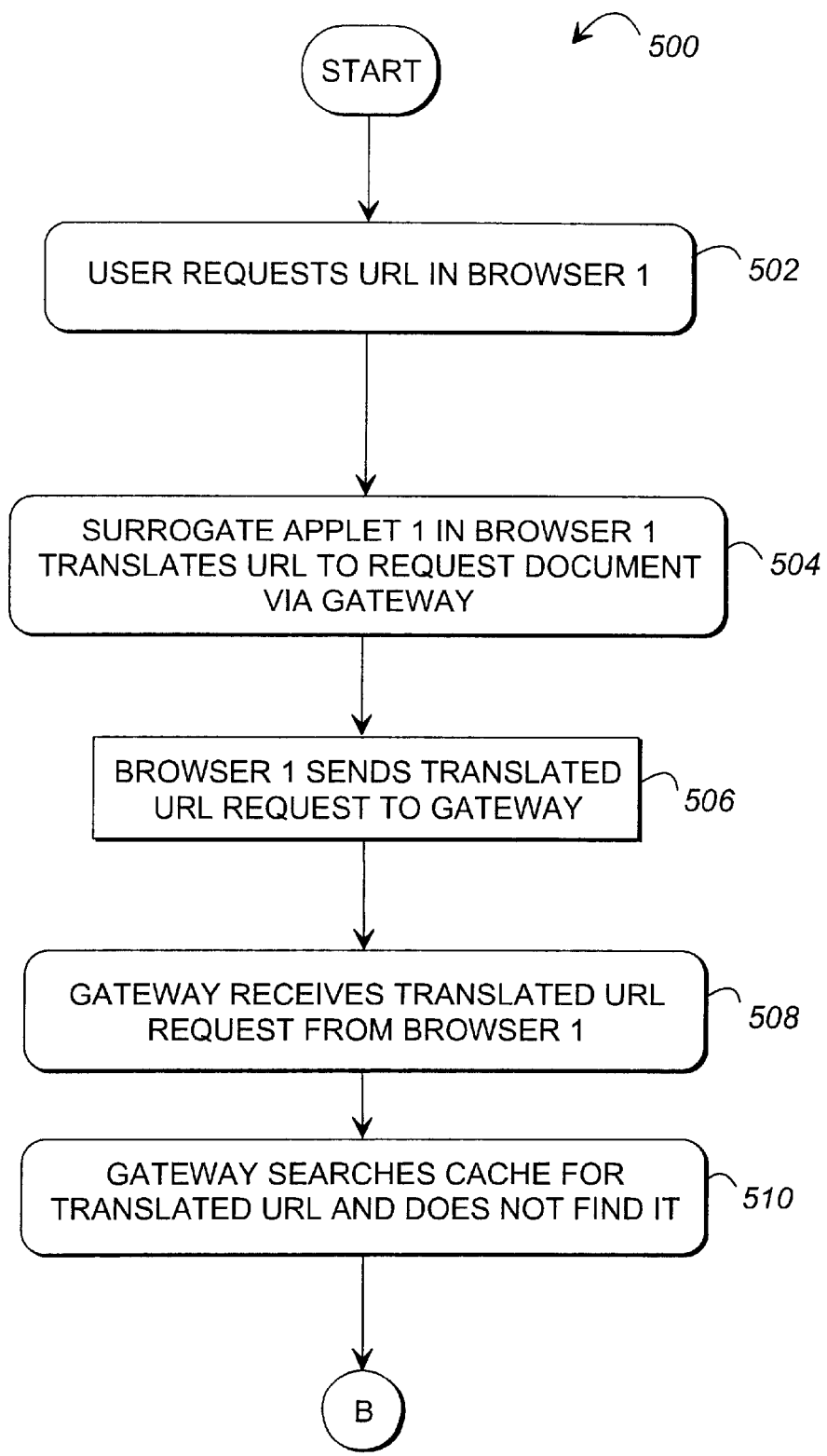
FIGS. 5A through 5D is a flow chart illustrating a web-based interactive browsing method according to an exemplary embodiment of the present invention.
Figure 5B:
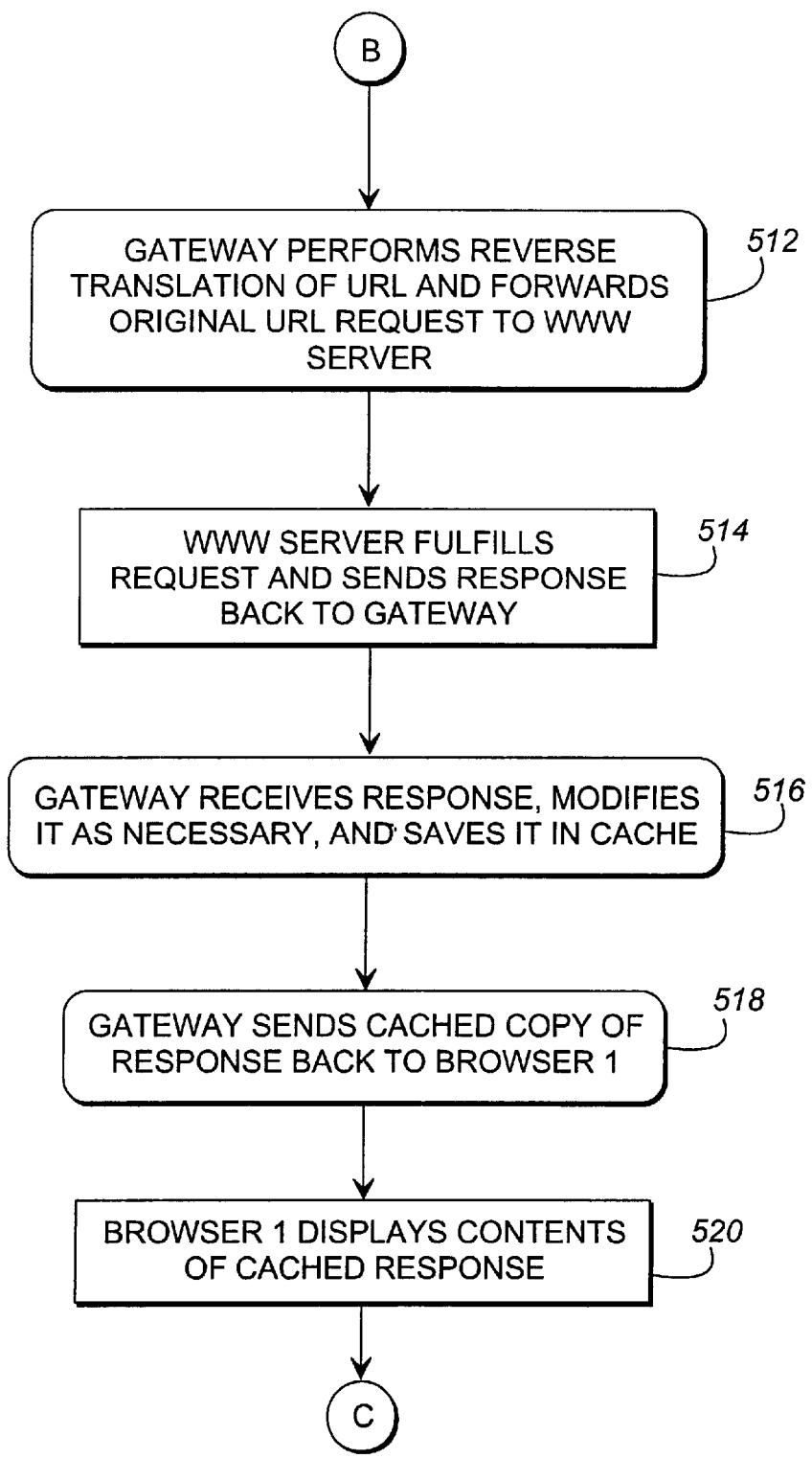
Figure 5C:
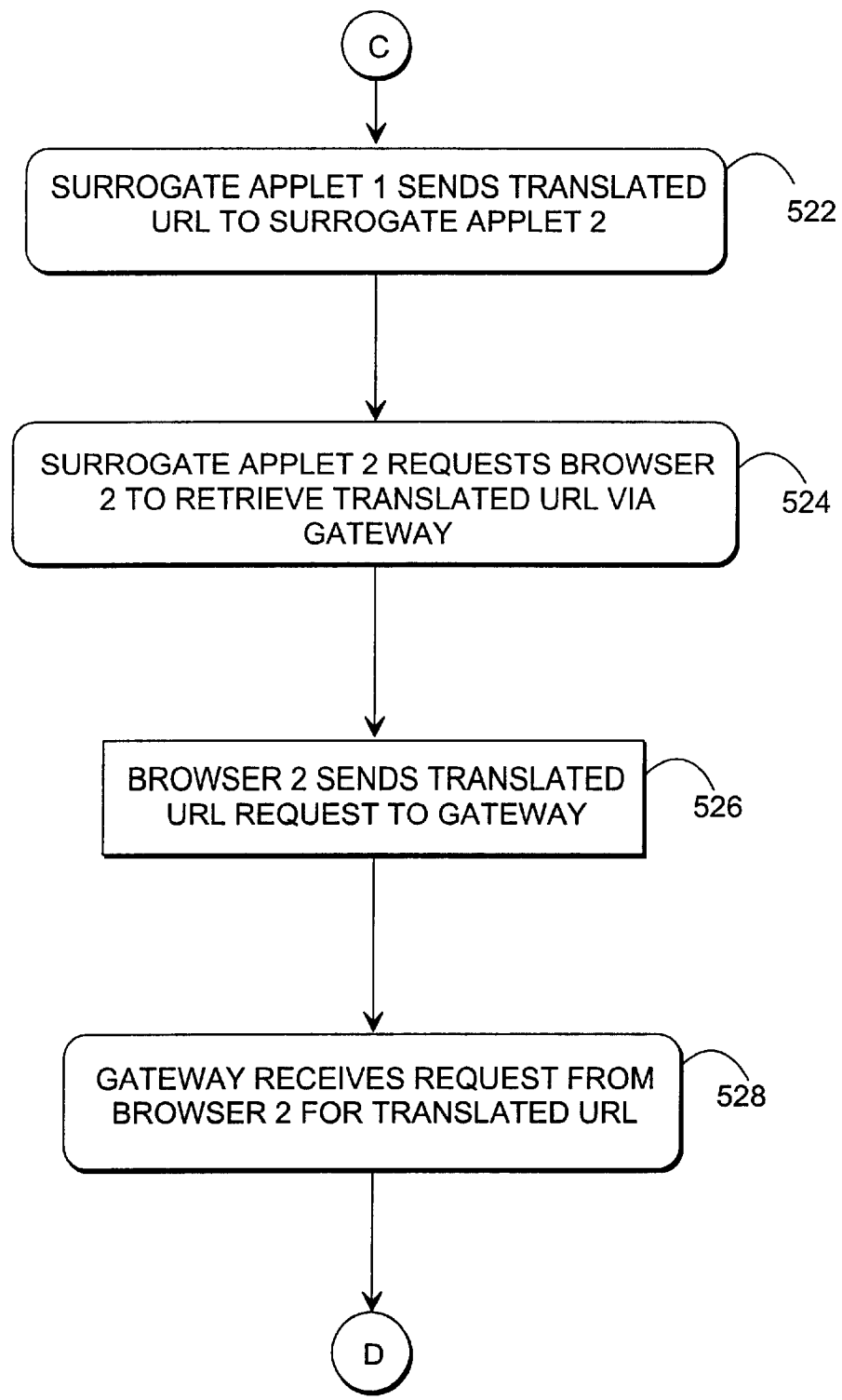
Figure 5D:
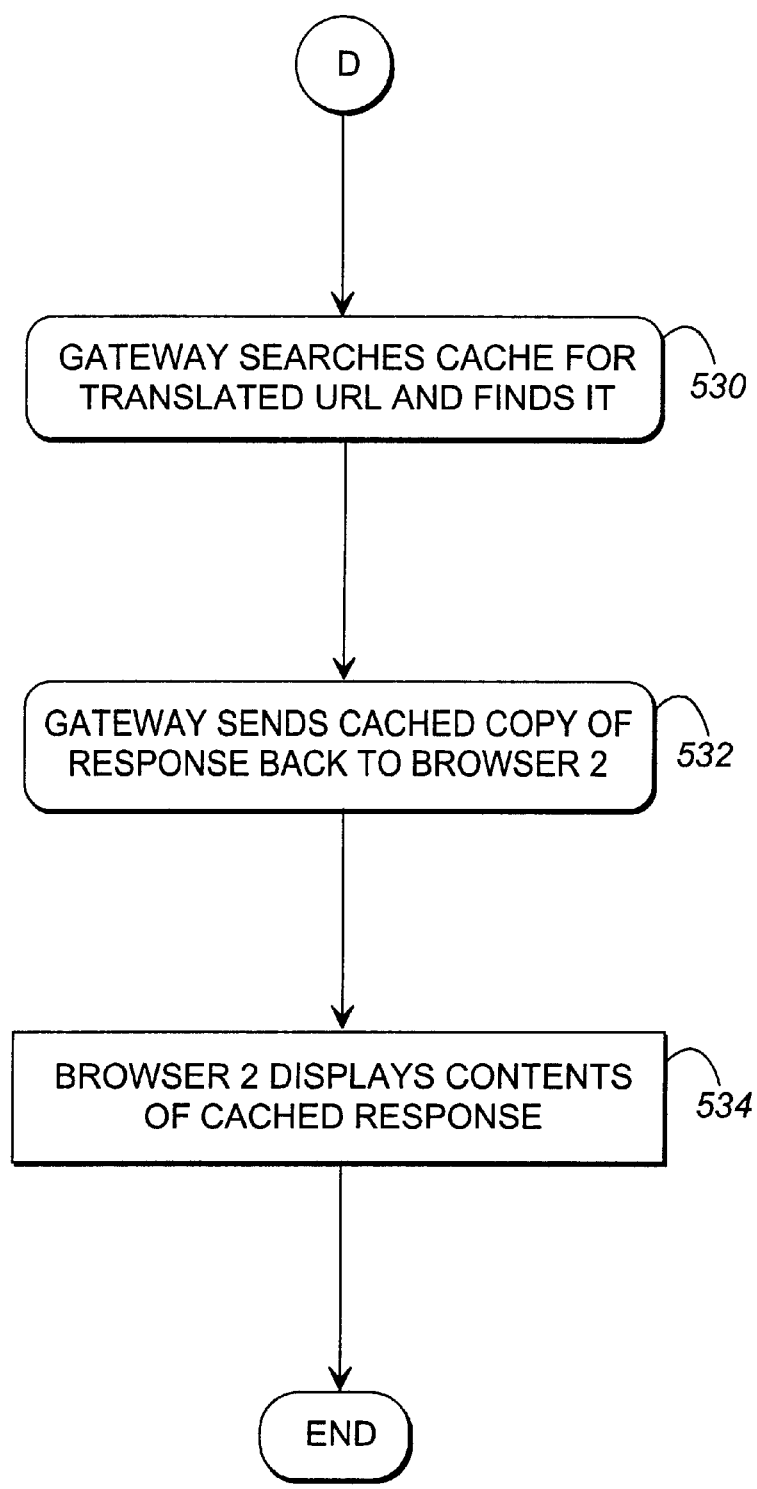

FIG. 4 illustrates a client-server system in which web-based interactive browsing according to the invention may be implemented. As shown, a client computer 402 (client 1), a client computer 404 (client 2), a gateway 406, and a server 408 are coupled via respective communications channels over the WWW network 410. Client 402 includes a processor 412 and associated memory 414 for, e.g., running the browser 302 and surrogate 304 according to the invention, as described herein. Likewise, client 404 includes a processor 416 and associated memory 418 for, e.g., running the browser 306 and surrogate 308 according to the invention, as described herein. Gateway 406 includes a processor 420 and associated memory 422 for performing the operations of the gateway 312, as described herein. It is to be appreciated that the cache 314 may be part of the memory 422. The server 408 includes a processor 424 and associated memory 426 for performing the operations associated with the WWW server 320. It is to be understood that the communications channels 310, 316, 318, and 322 of FIG. 3, maybe implemented as TCP/IP connections, as are known in the art, over the WWW 410 in FIG. 4.

While the gateway 312 is shown in FIG. 4 as being implemented on a separate computer, it is to be appreciated that this is not necessary for the invention. That is, the gateway 312 may be alternatively implemented on the server 408, or at either client computers 402 or 404. Still further, the gateway 312 may be implemented on the server system 100 (FIG. 1) used to establish the surrogates in the client computers. That is, the particular computer employed to execute the functions of the gateway is not critical to the invention. Also, it should be understood that the server 408 could be the same server that aids in establishing the surrogates in the browsers (e.g., server system 100 in FIG. 1).

Referring now to FIGS. 5A through 5D, a flow chart of a web-based interactive browsing method 500 according to an exemplary embodiment of the present invention is shown. In step 502, a user requests a URL using browser 1 (browser 302). Then, in step 504, the surrogate applet 1 (surrogate 304) intercepts the request and translates the request. Translation includes modifying the URL request such that an address associated with the gateway 312 is included therewith. In this manner, the request is first directed to the gateway rather than directly to the intended server. The browser 1 then sends the translated URL request to the gateway, in step 506, which is received by the gateway, in step 508.

Next, the gateway 312 searches its cache 314 for the translated URL (step 510). Assuming that this is the first time the browser 1 is requesting the URL in this session, the gateway does not find the URL in its cache. In step 512, the gateway then performs a reverse translation of the URL (e.g., removes any modification made to the request by surrogate applet 1) and forwards the original URL request to WWW server 320.

WWW server 320 then fulfills the request and sends the response (e.g., HTML document) back to the gateway 312, in step 514. The gateway receives the response, modifies it as necessary, and saves the response in its cache (step 516). That is, in its cache memory, the gateway associates the translated URL request received from browser 1 with the received response. In step 518, the gateway sends a copy of the cached response back to browser 1, which displays the contents of response to the user, in step 520.

Next, in step 522, surrogate applet 1 sends the translated URL request to surrogate applet 2 (surrogate 308). In response, surrogate applet 2 requests associated browser 2 (browser 306) to retrieve the translated URL via gateway 312 (step 524). Browser 2 then sends the translated URL request to the gateway, in step 526, which is received by the gateway, in step 528. The gateway then searches its cache for the translated URL. Since, in step 516, the gateway saved the translated URL in conjunction with the response received from the WWW server, the gateway locates the translated URL request (step 530). The gateway sends a copy of the cached response back to browser 2, in step 532. Browser 2 then displays the contents of the cached response to its associated user, in step 534.

Also, it is to be understood that browser 2 may initiate a translated URL request to the gateway, in which case, browser 1 is the recipient of the copy of the cached response. It is to be further understood that steps 522 through 534 are performed for each browser connected to browser 1.

Advantageously, in this manner, multiple users may participate in interactive browsing that involves dynamically generated content associated with stateful servers. That is, referring back to the e-commerce website example previously mentioned, if a user associated with browser 1 and a user associated with browser 2 are jointly viewing and selecting items available on the website, a URL request to place an order for the selected items is only generated once at the subject server, i.e., in response to the initiating surrogate. Then, all other connected browsers may review the results of the single order. By way of another example, when the initiating user clicks on a "Visitors Count" icon on a webpage, which gives the user the current number of persons visiting the site (incremented by one to include the user), only one URL request is sent to the subject server, rather than a request for each connected browser.

Further, unlike a conventional arrangement that employs a caching proxy server, an interactive web-based browsing system according to the invention permits the use of a firewall. That is, the firewall may be placed between the gateway 312 and any WWW server such as, for example, server 320 (FIG. 3). For example, the firewall may be implemented in the same computer device that implements the gateway, e.g., computer 406 (FIG. 4), or in its own dedicated computer device.

Still further, it is to be appreciated that each user participating in an interactive browsing session according to the invention does not necessarily need to establish a surrogate applet in his browser. That is, for example, a user can receive the translated URL from the other browser, via the controller of server system 100 (FIG. 1), and then manually enter the translated URL to be sent to the gateway 312. In this manner, the user operating his browser without a surrogate can also get a copy of a HTML document requested by another participating browser using a surrogate.

One of ordinary skill in the art will realize that the teachings of the invention described herein can be applied to many and varied applications. By way of example only, it is to be understood that the techniques of the invention have application in Web-based call centers where customer service agents interact with customers. In such an application, the interaction between agent and customer may involve changes in server-side state (e.g., financial transactions, order placement, etc.), but there is a need to have the agent and customer see the same content. Thus, referring to FIG. 4, if computer 402 is an agent and computer 404 is a customer, such requirements as mentioned above are satisfied according to the invention. That is, by employing a gateway, the agent and customer could both view dynamically generated (i.e., stateful) content provided by server 408.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method of interactively sharing information between at least two devices in a computer network, each device having a respective browser associated therewith for handling the information, the method comprising the steps of:

in accordance with a network element operatively positioned between a first device and an information source in the network, retrieving information from the information source in the network for storage in response to receipt of a request from a first browser associated with the first device to retrieve the information, wherein the request from the first browser is automatically translated at the first device so as to be directed to the network element such that the network element is substantially transparent to the first browser; and in accordance with the network element, sending the stored information to at least a second browser of at least a second device in response to receipt of a similar request therefrom, the second device receiving the request from the first device, such that the devices can share the information retrieved from the information source in response to the single request made to the source in accordance with the network element.

2. The method of claim 1, wherein a surrogate is established in at least the first device for informing the second device of the request made such that the browser of the second device can make the similar request.

3. The method of claim 2, wherein a surrogate is established in the second device for communicating with the surrogate established in the first device.

4. The method of claim 1, wherein the information available from the information source in the computer network includes dynamically changing content.

5. The method of claim 1, wherein the request from the first browser is associated with the retrieved information during storage.

6. The method of claim 5, further comprising, in accordance with the network element, the step of searching for previously stored information, in response to receipt of an information request from one of the devices, prior to retrieving the information from the information source.

7. The method of claim 1, wherein the step of retrieving the requested information further includes retrieving the requested information from the information source in the network through a firewall server.

8. The method of claim 1, wherein the request is representative of an address associated with the information source.

9. The method of claim 8, wherein the computer network is the Internet and the address is a URL.

10. The method of claim 9, wherein the requested information includes at least one HTML document.

11. A method of interactively sharing information between at least two devices in a computer network, each device having a respective browser associated therewith for handling the information, the method comprising the steps of:

downloading code to a first browser associated with a first device to establish a surrogate therein, the surrogate translating requests from the browser, wherein request translation is automatically performed by the surrogate such that the network element is substantially transparent to the first browser;

in accordance with a network element operatively positioned between the first device and an information source in the network, retrieving information from the information source in the network for storage in response to receipt of a translated request from the surrogate of the first browser to retrieve the information; and in accordance with the network element, sending the stored information to at least a second browser of at least a second device in response to receipt of a similar translated request therefrom, the second device receiving the translated request from the first device, such that the devices can share the information retrieved from the information source in response to the single request made to the source in accordance with the network element.

12. Apparatus for interactively sharing information between at least two devices in a computer network, each device having a respective browser associated therewith for handling the information, the apparatus comprising:

a processor, associated with a network element operatively positioned between a first device and an information source in the network, for retrieving information from the information source in the network in response to receipt of a request from a first browser associated with a first device to retrieve the information, wherein the request from the first browser is automatically translated at the first device so as to be directed to the network element such that the network element is substantially transparent to the first browser, the processor further being operable to send the information to at least a second browser of at least a second device in response to receipt of a similar request therefrom, the second device receiving the request from the first device, such that the devices can share the information retrieved from the information source in response to the single request made to the source in accordance with the network element; and memory, associated with the network element, for storing the retrieved information in association with the request from the first browser.

13. The apparatus of claim 12, wherein a surrogate is established in at least the first device for informing the second device of the request made such that the browser of the second device can make the similar request.

14. The apparatus of claim 13, wherein a surrogate is established in the second device for communicating with the surrogate established in the first device.

15. The apparatus of claim 12, wherein the information available from the information source in the computer network includes dynamically changing content.

16. The apparatus of claim 12, wherein the processor searches the memory for previously stored information, in response to receipt of an information request from one of the devices, prior to retrieving the information from the information source.

17. The apparatus of claim 12, wherein the processor retrieves the requested information from the information source in the network through a firewall server.

18. The apparatus of claim 12, wherein the request is representative of an address associated with the information source.

19. The apparatus of claim 18, wherein the computer network is the Internet and the address is a URL.

20. The apparatus of claim 19, wherein the requested information includes at least one HTML document.

21. An article of manufacture for enabling interactive sharing of information between at least two devices in a computer network, each device having a respective browser associated therewith for handling the information, the article comprising a machine readable medium containing one or more programs which when executed implement the steps of:

in accordance with a network element operatively positioned between a first device and an information source in the network, retrieving information from the information source in the network for storage in response to receipt of a request from a first browser associated with a first device to retrieve the information, wherein the request from the first browser is automatically translated at the first device so as to be directed to the network element such that the network element is substantially transparent to the first browser; and in accordance with the network element, sending the stored information to at least a second browser of at least a second device in response to receipt of a similar request therefrom, the second device receiving the request from the first device, such that the devices can share the information retrieved from the information source in response to the single request made to the source in accordance with the network element.

22. A method of interactively sharing information between at least two devices in a computer network, each device having a respective browser associated therewith for handling the information, the method comprising the steps of:

generating a request at a first browser associated with a first device to retrieve information from an information source in the network;

directing the request to a storage element operatively residing between the first browser and the information source so that the storage element retrieves the information from the information source in response to receipt of the request, wherein direction of the request includes automatically modifying the request at the first device so as to be directed to the storage element rather than to the information source such that the storage element is substantially transparent to the first browser;

storing the retrieved information at the storage element;

sending the retrieved information from the storage element to the first browser; and sending the retrieved information from the storage element to at least a second browser of at least a second device in response to receipt of a similar request therefrom, the second device receiving the request from the first device, such that the devices can share the information retrieved from the information source in response to the single request made to the source.

23. The method of claim 22, wherein program code is established in at least the first device for informing the second device of the request made such that the browser of the second device can make the similar request.

24. The method of claim 23, wherein program code is established in the second device for communicating with the program code established in the first device.

25. The method of claim 23, wherein the directing step further comprises the program code in the first device modifying the request generated at the first browser so that the request goes to the storage element rather than directly to the information source.

26. The method of claim 22, wherein the information available from the information source in the computer network includes dynamically changing content.

27. Apparatus for interactively sharing information between at least two devices in a computer network, each device having a respective browser associated therewith for handling the information, the apparatus comprising:

at least one processor associated with a first device operative to: generate a request at a first browser associated with the first device to retrieve information from an information source in the network; and direct the request to a storage element operatively residing between the first browser and the information source so that the storage element retrieves the information from the information source in response to receipt of the request, wherein direction of the request includes automatically modifying the request at the first device so as to be directed to the storage element rather than to the information source so that the storage element is substantially transparent to the first browser, such that the retrieved information may be: (i) stored at the storage element; (ii) sent from the storage element to the first browser; and (iii) sent from the storage element to at least a second browser of at least a second device in response to receipt of a similar request therefrom, the second device receiving the request from the first device, such that the devices can share the information retrieved from the information source in response to the single request made to the source.

28. The apparatus of claim 27, wherein the directing operation further comprises modifying the request generated at the first browser so that the request goes to the storage element rather than directly to the information source.

* * * * *